June 14, 1966  F. W. ARMYTAGE  3,255,635
CONTROL MECHANISM

Filed Feb. 10, 1964  5 Sheets-Sheet 1

INVENTOR:
FREDERICK WILLIAM ARMYTAGE
BY
ATTORNEYS

June 14, 1966  F. W. ARMYTAGE  3,255,635
CONTROL MECHANISM

Filed Feb. 10, 1964  5 Sheets-Sheet 2

INVENTOR:
FREDERICK WILLIAM ARMYTAGE
BY
Kenyon & Kenyon
ATTORNEYS

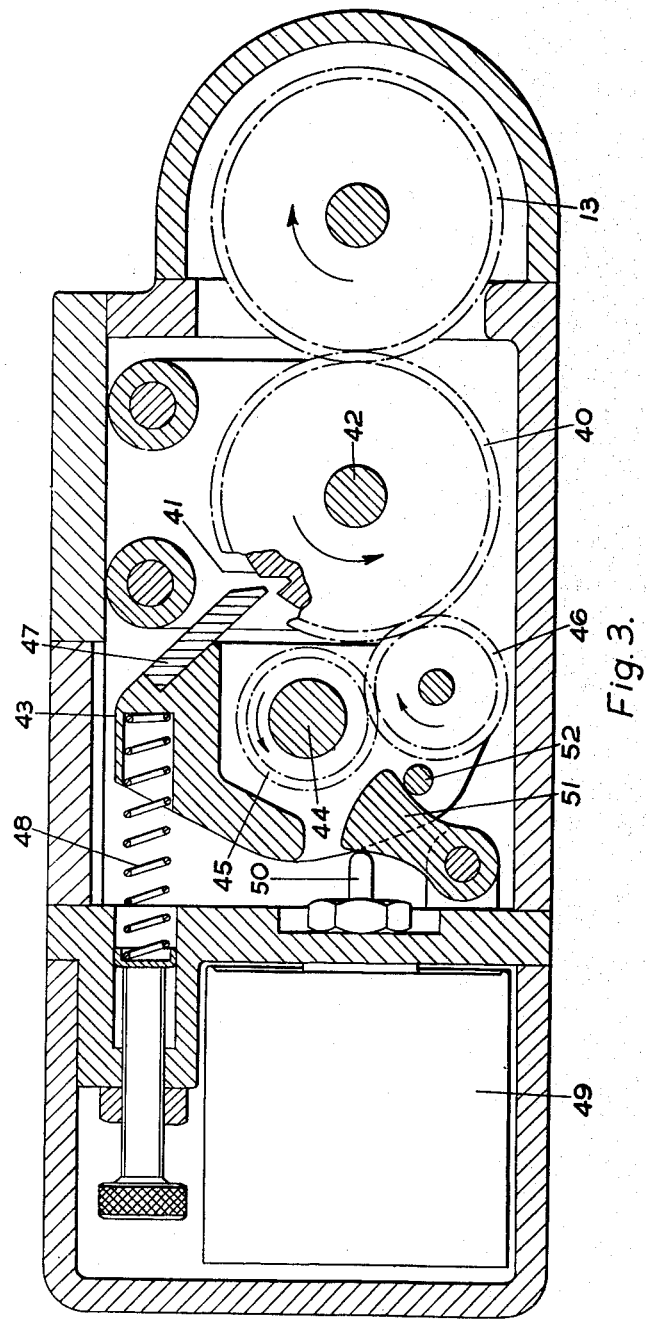

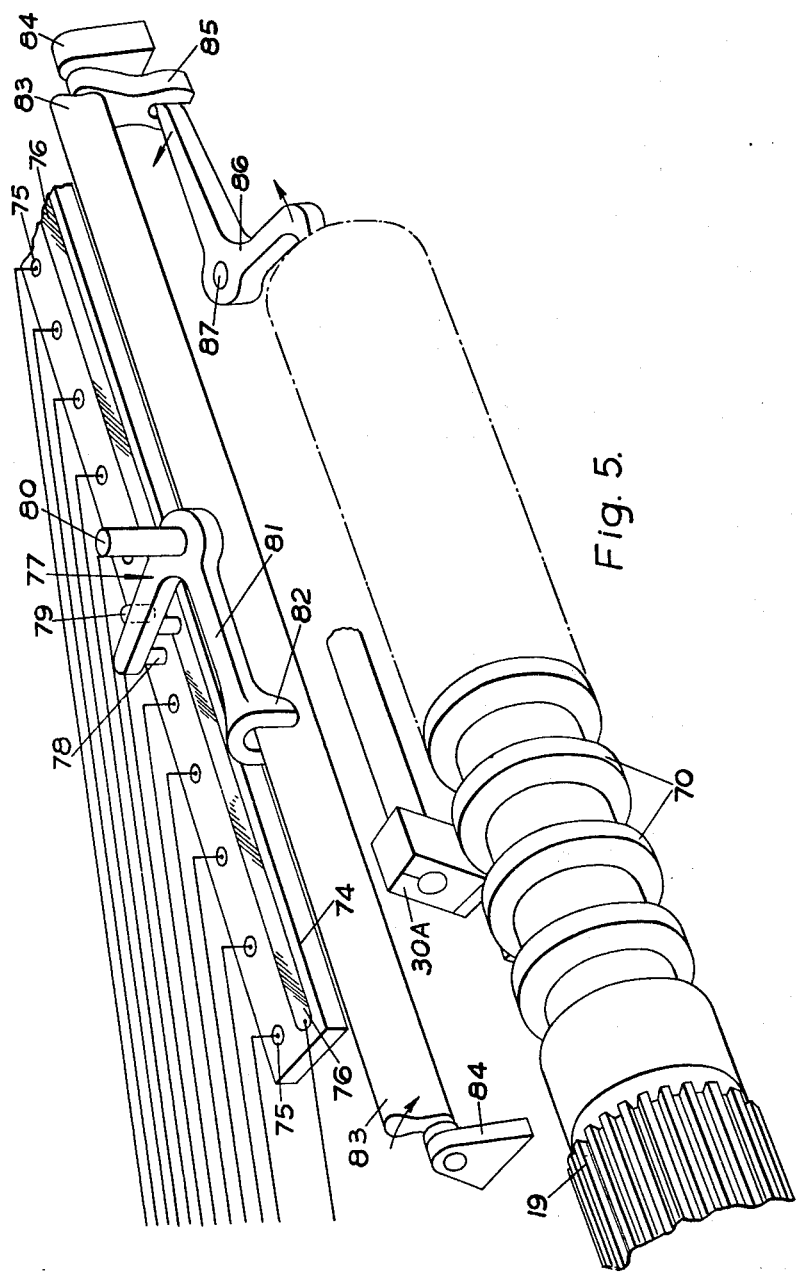

United States Patent Office 3,255,635
Patented June 14, 1966

3,255,635
CONTROL MECHANISM
Frederick William Armytage, Foundry Lane,
Knottingley, Yorkshire, England
Filed Feb. 10, 1964, Ser. No. 343,733
9 Claims. (Cl. 74—1)

This invention relates to control mechanism for positioning by oil hydraulic power means and according to predetermined data supplied to said mechanism, a tool, workpiece, component, or machine part mounted in a machine tool, assembly machine or the like.

The chief object of the invention is to provide a control mechanism for this purpose which does not utilize electronic devices such as computers, but one which achieves great accuracy of movement with reasonable speed, which can be manufactured at a far smaller cost than those embodying electronic devices, and which can be maintained and have any defect which may arise corrected must more easily.

In a simple form the mechanism according to this invention includes one or more electrical counting units operable according to predetermined data, a mechanical measuring unit arranged to be operated under control from said counting unit or units, and a feeler device movable over said measuring unit and coupled to an oil hydraulic positioning valve and arranged to control through said valve the operation of one or more oil hydraulic power means for positioning said element. The hydraulic positioning valve is of the kind similar to that known as a tracer valve used in hydraulic tracing or duplicating mechanisms and is capable of opening and closing with a movement of the order of only a few thousandths of an inch.

The electrical counting units may each embody a selection transfer device comprising a series of contacts and a relatively movable contact element, and electrical means operated thereby for coupling driving means to said mechanical measuring unit to move same by the appropriate amount according to the predetermined data. These counting units may be actuated in various ways, for example:

(1) By hand or power in accordance with dial or other indicators corresponding to the predetermined data.
(2) By a punched card system to give automatic sequence and programming of the movements of the tool or the like.
(3) By a rotary drum carrying indications corresponding to the predetermined data to give automatic programming and continuous repetitive or cyclical operation.

The mechanical measuring unit may embodying a series of sets of rotary stepped devices representing dimensions of length given to (say) three decimal places, each set being arranged to be turned by means controlled by its own said counting unit to a degree which produces a cumulative movement of the rotary stepped devices resulting in the influencing of the feeler device so as to operate the hydraulic positioning valve and so cause the required movement of the tool or other element.

It will be understood that a single control mechanism as outlined above would produce a movement of predetermined dimension in one direction, whilst two could be used to move a tool or other element to a predetermined coordinate position and three could cooperate to give a three-dimensional coordination.

In order that the invention may be fully and clearly comprehended the same will now be described with reference to the accompanying drawings, wherein:

FIGURE 3 is a cross-section taken through a constructional form of a counting unit as illustrated in FIGURE 2 but viewed from the opposite direction, showing the operative connection between the parts of FIGURES 1 and 2;

FIGURE 5 is a diagrammatic perspective view of an alternative form of bush assembly for measuring the integer digit or digits to replace the stepped bush assembly shown in FIGURE 1;

In the illustrated example of the invention it is presumed that a worktable slide on which is secured a workpiece to be operated upon is connected to the ram rod of a hydraulic cylinder so that it can be positioned by the hydraulic pressure under control from the positioning valve.

Figure 1:
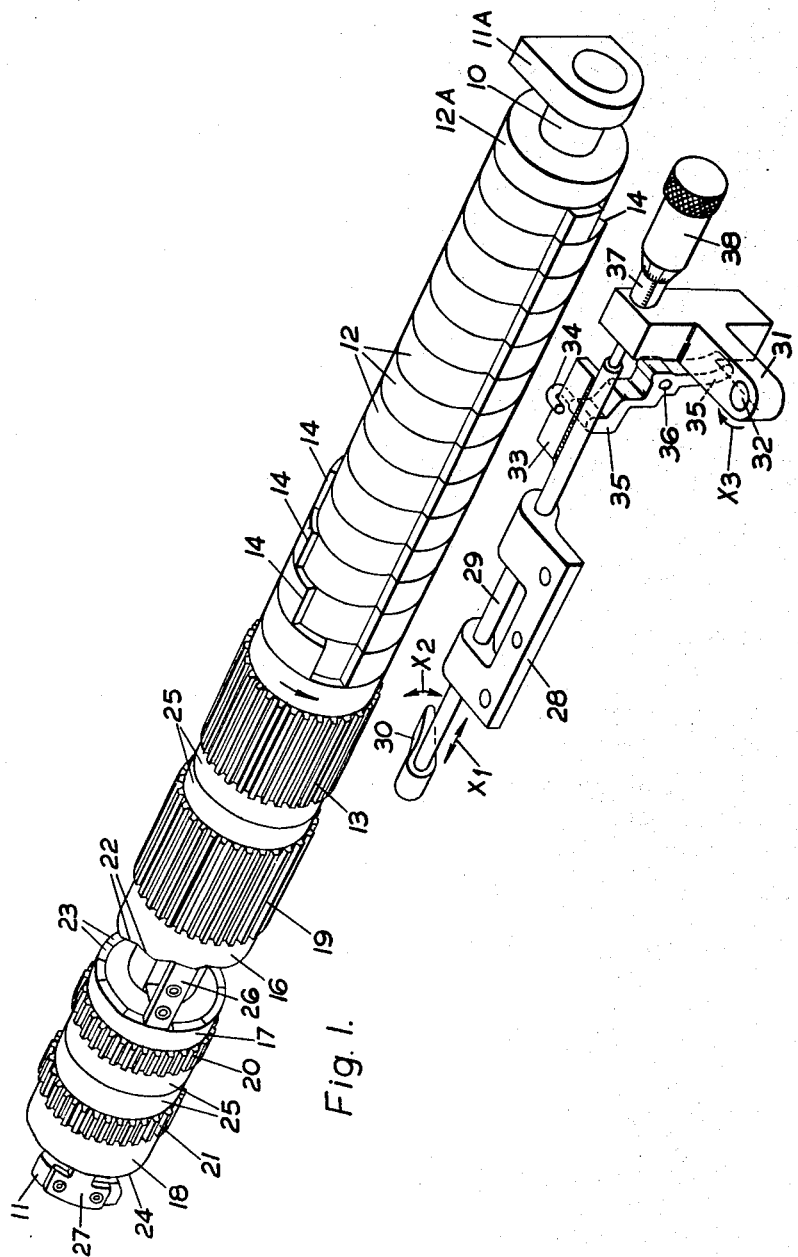
FIGURE 1 is a diagrammatic perspective view of a mechanical measuring unit according to the invention showing also the stylus or feeler device which cooperates with it.

The mechanical measuring unit of FIGURE 1 includes a shaft 10 secured in end brackets 11, 11A fixed to the machine frame. Mounted on a sleeve surrounding this shaft is an assembly of bushes 12 which can be rotated as a whole by a co-axial gear wheel 13 and which are urged by an internal spring away from bracket 11A. These bushes have steps 14 which are staggered in spiral formation except for end bush 12A which has no step, and there are fifteen bushes each 1" wide to give a range of movement for the positioning ram of integers from 1" up to 14".

Also rotatable and axially movable upon the shaft 10 are three decimal drums 16, 17, 18 each with its driving gear wheel 19, 20, 21. Each drum has on one face a ring of ten steps 22, 23, 24 projecting parallel to the axis of the shaft, those on drum 16 increasing progressively by increments of 0.100", those on drum 17 by 0.010" and those on drum 18 by 0.001". Between gears 13 and 19 and also between gears 20 and 21 are thrust rings 25. Between drums 16 and 17 is a bearer 26 which is axially slidable but non-rotatable upon shaft 10 and its ends bear against the steps 22, 23 to transmit axial movement therebetween. A datum stop or abutment 27 secured on the bracket 11 engages the steps 24.

Thus rotation of the drums produces a cumulative axial movement of the bush assembly, the three drums representing the first, second and third decimal places (i.e. tenths, hundredths, and thousandths of an inch) of the length of movement to be transmitted whilst rotation of the bush assembly provides for the integers of the movement dimension required.

Mounted slidably and rotatably in a bracket 28 secured to the machine frame is a stylus rod 29 with stylus 30 which can be moved both axially and angularly as indicated by arrows X1, X2, and these movements are transmitted through an arm 31 secured at 32 on a spindle connected to the spool or valve member of a positioning valve which controls the flow of oil to the positioning ram for the table slide. The valve and spindle are not illustrated since they may be of well-known construction. Angular movement of the stylus is transmitted to arm 31 through a lug 33, claw 34, and lever 35 pivoted at 36. The arm 31 is normally urged by the usual valve bias spring in direction of arrow X3 against a datum abutment 37 which can be adjusted by micrometer screw 38 for rapid setting up or zeroing.

The positioning valve, stylus rod and the intermediate movement-transmitting mechanism are mounted for movement with the table slide, the stylus rod being parallel to the bush assembly so that the stylus will be influenced by these bushes according to the position in which they have been set both axially and angularly.

Each driving gear wheel 13, 19, 20, 21 has its own counting unit comprising a combined gear wheel 40 and toothed dog brake 41 rotatable on shaft 42; a driving and braking assembly 43 rockably mounted on an input drive shaft 44 which is driven at constant speed and on which is secured gear wheel 45 engaging gear wheel 46 which latter can drive gear wheel 40 in the direction shown by the arrows or alternatively be disengaged therefrom; a dog 47 fixed on assembly 43 and normally urged by compression spring 48 into locking engagement with a tooth of dog brake 41; and a solenoid 49 whose plunger 50 can push pivoted arm 51 against a bar 52 on the assembly 43 to rock the latter in the direction of arrow Y to disengage the dog brake and engage gears 46 and 40. The rockable assembly 43 is shown in FIGURE 3 in the driving position with the dog 47 disengaged. Rotatable with the wheel 40 and brake 41 is a slip ring 53 with feeder brush 54 and carrying a distributor brush 55 which passes round and touches a ring of contacts 56 on a stationary support 57, the whole forming a selection transfer device (acting somewhat like a commutator) when coupled in an electrical circuit as hereinafter described. In the counting unit which controls the bush assembly the dog brake has fifteen teeth and there are fifteen contacts, but in the other units there are ten dog teeth and ten contacts.

Figure 4:
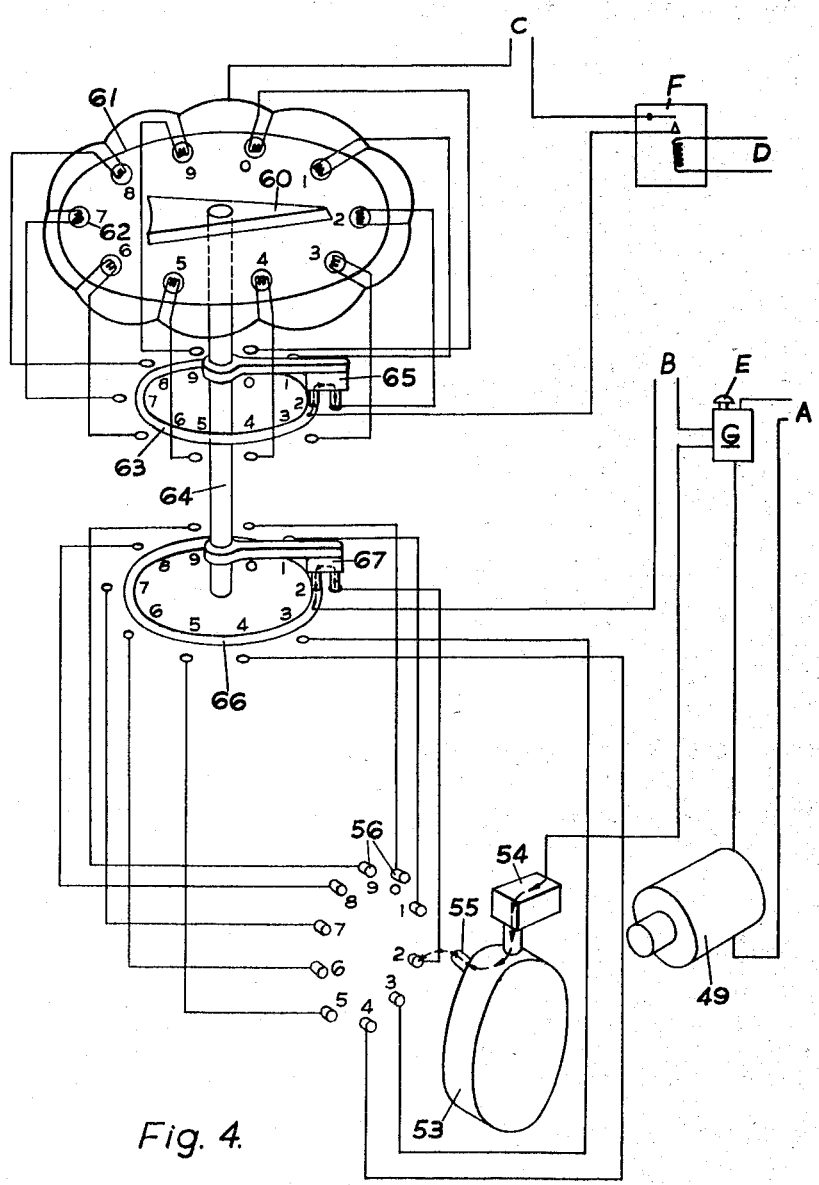
FIGURE 4 is an electrical circuit diagram illustrating how the counting units as in FIGURE 2 can be fed with the required data through dimension selector means operated by hand setting of a series of dial switches.

Referring to FIGURE 4, the circuits there indicated would be contained in a control cabinet having on its face four slection dials each with a rotary pointer 60 and a ring of numerals arranged to be illuminated from within, and having a starting button E. One dial is numbered 0 to 14 and the others 0 to 9 corresponding respectively with the integer bush assembly 12 and the decimal drums 16, 17, 18.

One of these ten-point dials is indicated at 61 with its ten indicator lamps 62 connected in an indicator circuit to correspondingly numbered contacts around the contact ring 63 in the top half of a two-gallery rotary selector switch 64, this circuit also connecting the rotary brush 65, feed C, relay F, and feed D. The lower gallery of switch 64 has a similar number of contacts round its contact ring 66 wired to the corresponding contacts 56 of a ten-contact selection transfer device similar to that shown in FIGURE 2, and these contacts are connected in a selector circuit through rotary brush 67 and the brushes 54, 55 to feed B and button E. The latter operates a switch in relay control box G, this relay controlling the current from feed A to the solenoid 49 of the corresponding counting unit (or preferably to all four solenoids in parallel).

The operation is as follows. The operator turns each pointer 60 to the digits of the required dimension (e.g. 9.992) to which the workpiece is to be moved—in FIGURE 4 the digit 2 has been selected. Prior to this operation, an electrically operated control valve of suitable known kind has automatically cut off the supply of oil to the positioning valve so that movement of the stylus does not immediately actuate the positioning ram. On pressing button E the solenoids 49 are energised to connect the drive from the already rotating shaft 44 to the gear wheels 40. As each brush 55 reaches the live continuous contact 56 corresponding to the selected digit, circuit feed B is completed and through control relay box G feed A is opened to de-energise the solenoid, thereby disconnecting gears 46 and 40 and engaging dog 47 in the correct tooth of brake 41 so as to arrest the corresponding gear wheel on the measuring unit positively in the selected position to bring into operation the selected steps 14, 22, 23, 24.

If, during this rotation of assembly 12, the stylus has been moved axially by movement past it of a step 14, the spool of the positioning valve will be moved into one of its two extreme positions. If the stylus moves up a step, the spool is moved to a position which will cause movement of the positioning ram in one direction when oil flows through said valve, but if the stylus moves down a step, the spool will dictate movement of the ram in the opposite direction. Of course, if a rotating step does not engage the stylus, there will be no change in direction from the previous positioning movement of the ram.

The flow of oil to the positioning valve is held in check until all four solenoids 49 have been de-energized, whereupon the breaking of the last feed A circuit again operates the automatic control valve to readmit oil to the positioning valve and so render the stylus sensitive. As the ram now moves the table in the direction already dictated by the angular movement of the stylus, the stylus rod is moved axially with the table.

Thus the stylus feels its way to the side of the step 14 which represents the selected total dimension and holds itself there. A detector valve in the hydraulic system then operates to complete the feed D circuit and this, through relay F, completes the indicator circuit feed from C to indicate, by illuminating the appropriate lamps 62, that the table has reached the selected position. Any desired operation on the workpiece can then be carried out.

It will be clear that a duplicate control mechanism as above described could be used with a worktable having compound slides to position the table in a second direction, thus giving co-ordinate positioning, the whole mechanism from the selection dials to the positioning valve being duplicated, but if desired with all the dials and start buttons located in a common control cabinet.

Instead of using the hand selection dials which have to be re-set for each movement of the workpiece or other part to be positioned, a rotary function drum of generally known kind may be set up with a series of contact devices so arranged that each time the drum is moved the aforesaid counting units are operated to re-position the workpiece or the like. Thus a sequence or cycle of positioning movements can be produced automatically and, if desired, any number of automatic repetitions of this cycle.

Figure 6:
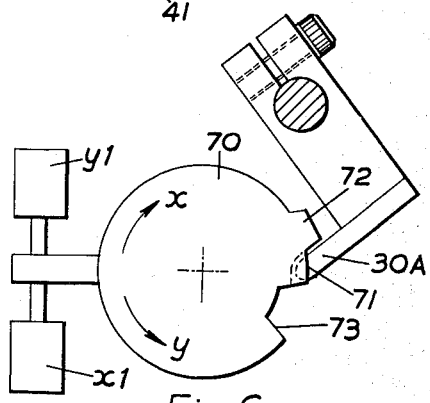
FIGURE 6 is a diagram illustrating the action of the means shown in FIGURE 5.
Figure 7:
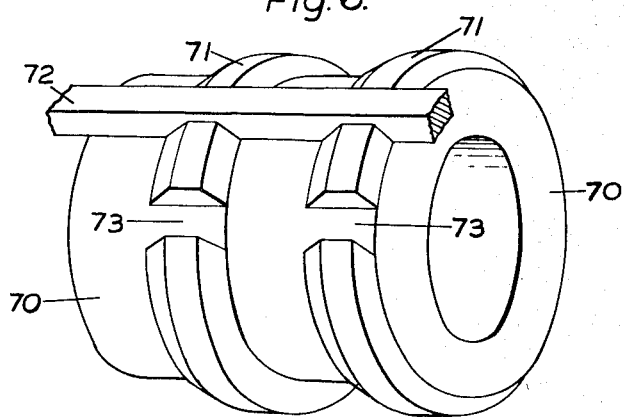
FIGURE 7 is an enlarged perspective view of two of the stepped bushes indicated in FIGURES 5 and 6 in assembled position.

In the alternative construction of FIGURES 5 to 7, the bush assembly is made up of bushes 70 mounted so that it can be moved axially by rotation of any or all of the stepped drums 16, 17, 18 as already described, but instead of being rotated in one direction by its counting unit it is merely rocked through a small angle by a selection transfer device operating by linear movement instead of by the rotary movement described with reference to FIGURES 1 to 4. The bushes 70, as shown in FIGURES 6 and 7, have annular ribs 71 with inclined sides, and through which extends a key or other raised strip 72 and a series of slots 73, the strip and the slots forming two clear pathways extending the length of the bush assembly. This assembly can be held centrally as shown in FIGURE 6 or it can be rocked in the direction of arrows $x$, $y$ by solenoids $x1$, $y1$ and the stylus 30A can move along strip 72 or slots 73 or can abut against any of the ribs 71 when the assembly is central.

The selection transfer device instead of being rotary like parts 53 to 56, consists of a fixed linar selector bar 74 having (in the present example) fifteen contacts 75 and a continuous contact 76 along which a brush holder 77 is moved by a suitable connection from the worktable. The holder 77 has two brushes 78, 79 arranged to touch two adjacent contacts 75, and the contacts are made live according to the setting of the indicator dials through the rotary selector device described with reference to FIGURE 4.

The solenoids x1, y1 can receive one of three command signals from the brushes of the linear selector bar 74 which are interlocked with the dial indicator selector switches by a suitable system which will be known to those skilled in the art. When brushes 78, 79 touch two live contacts 75, one signal is given; when they touch two dead contacts a different signal is given; and when they touch one live and one dead contact another different signal is given. Accordingly, when the brush assembly is rocked to one side of the central position, the stylus rides on the key 72 and deflects the positioning valve spool to move the stylus with the worktable to the right in FIGURE 5. When the bushes are rocked to the other limit the stylus is free to slide through the slots 73 to the left in FIGURE 5 because the valve spool is spring-biassed in that direction. When the brushes are centralised however, the stylus will occupy a mid position and, when oil is readmitted to the positioning valve, the resultant movement of the worktable ram will cause the stylus to move along the bush assembly until it stops against the face of the rib 71 on the bush corresponding to the integer which has been selected, thereby causing the worktable to be positioned according to the dimension of that integer plus any decimal digits which may have been selected.

In order to permit the axial movement of the bush assembly, which may be anything from 0 to 0.999 in the present example, whilst keeping the brushes 78, 79 on their selected contacts 75, the brush holder 77 (see FIGURE 5) is pivotally mounted on a spindle 80 and has an arm 81 whose forked end 82 engages a bar 83 pivoted at its ends in brackets 84 fixed to the machine frame. This bar can be rocked through an arm 85 by a bell-crank lever 86 which is pivoted at 87 and engages the end of the bush assembly. The movement of these parts in one direction is indicated by the arrows in FIGURE 5.

Figure 2:
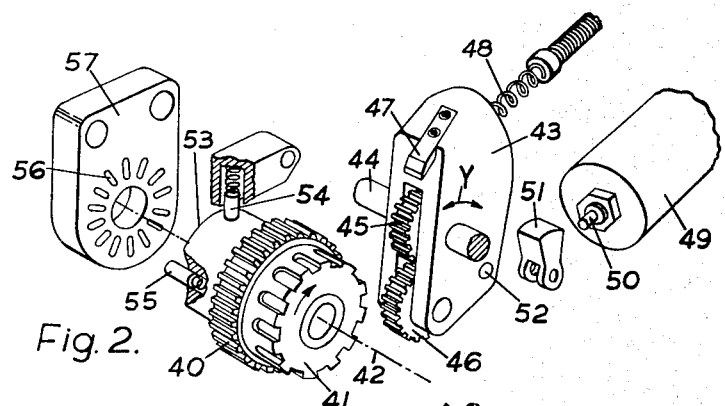
FIGURE 2 is an exploded diagrammatic view of one of the counting units which operate the measuring unit.

Whilst it may be preferred, in some practical applications of the invention when using the bush assembly of FIGURES 5 to 7, to operate this assembly by rocking it through a small angle by means of solenoids as above described, it may be preferred in some cases to move the assembly of bushes 70 in one direction only, this rotary movement being transmitted to the assembly by the gear wheel 13 from the driving mechanism described with reference to FIGURES 2 and 3, suitably modified as will be clearly understood.

I claim:

1. Control mechanism for positioning, by oil hydraulic power means and corresponding to predetermined data supplied to said mechanism, a tool, workpiece, component, machine part and like element mounted in a machine tool, assembly machine and the like, said control mechanism including at least one electrically operated counting unit operable according to predetermined data, a mechanical measuring unit arranged to be operated under control from said counting unit, said counting unit including driving means for said measuring unit, and a feeler device movable over said measuring unit and adapted to be coupled to an oil hydraulic positioning valve whereby said valve can perform a control function.

2. Control mechanism as called for by claim 1, wherein said mechanical measuring unit embodies a series of sets of rotary stepped devices each capable of representing one of the digits of a dimension of length, each set being arranged to be turned by means controlled by its own said counting unit to a degree which produces a cumulative movement of the rotary stepped devices resulting in the influencing of said feeler device so as to operate said hydraulic positioning valve and so cause the required movement of said element.

3. Control mechanism as called for by claim 2, wherein the first of said rotary stepped devices which measures the first digit of the movement dimension required has steps which are spirally arranged around it and with which said feeler device is arranged to co-operate.

4. Control mechanism as called for by claim 2, wherein the first of said rotary stepped devices which measures the first digit of the movement dimension required has steps which are spaced along its length and across which extend parallel to its axis of rotation a raised strip and a channel, said steps, strip and channel being arranged for influencing said feeler device.

5. Control mechanism as called for by claim 2, wherein all said rotary stepped devices are arranged end to end about the same axis of rotation and adapted for movement axially corresponding to the selected digits of the required movement dimension, those devices representing digits other than the first one each having a ring of steps which project parallel to said axis and which are arranged to produce when they are rotated, a cumulative axial movement which is transmitted to said first stepped device.

6. Control mechanism as called for by claim 2, wherein said electrical counting units each embody a selection transfer device comprising a series of contacts arranged in angular succession and a relatively movable rotary contact element, and electrical means operated by said selection transfer device for coupling said driving means to said mechanical measuring unit to move same by the appropriate amount corresponding to the predetermined data.

7. Control mechanism as called for by claim 2, wherein said electrical counting units each embody a selection transfer device comprising a series of contacts arranged in linear succession and a relatively linearly movable contact element, and electrical means operated by said selection transfer device for coupling said driving means to said mechanical measuring unit to move same by the appropriate amount corresponding to the predetermined data.

8. Control mechanism as called for by claim 6, wherein said driving means includes a constant speed drive shaft, a first gear wheel engaging a gear wheel connected to the rotary stepped device in question, a toothed dog brake device rotatable with said first gear wheel, a dog engageable with said brake device, a rockable driving and braking assembly adapted to couple said first gear wheel to said drive shaft and alternatively to disengage said drive and engage said dog with a predetermined tooth of said brake device, and a solenoid means for operating said rockable driving and braking assembly under control of said selection transfer device.

9. Control mechanism as called for by claim 7, wherein said driving means includes a constant speed drive shaft, a first gear wheel engaging a gear wheel connected to the rotary stepped device in question, a toothed dog brake device rotatable with said first gear wheel, a dog engageable with said brake device, a rockable driving and braking assembly adapted to couple said first gear wheel to said drive shaft and alternatively to disengage said drive and engage said dog with a predetermined tooth of said brake device, and a solenoid means for operating said rockable driving and braking assembly under control of said selection transfer device.

No references cited.

MILTON KAUFMAN, *Primary Examiner.*

BROUGHTON G. DURHAM, *Examiner.*